(12) United States Patent
Takahashi et al.

(10) Patent No.: US 9,601,279 B2
(45) Date of Patent: Mar. 21, 2017

(54) ELECTROLYTE SOLUTION AND ELECTROCHEMICAL DEVICE

(71) Applicant: DAIKIN INDUSTRIES, LTD., Osaka-shi, Osaka (JP)

(72) Inventors: Kenzou Takahashi, Settsu (JP); Meiten Koh, Settsu (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 114 days.

(21) Appl. No.: 14/420,443

(22) PCT Filed: Aug. 8, 2013

(86) PCT No.: PCT/JP2013/071478
§ 371 (c)(1),
(2) Date: Feb. 9, 2015

(87) PCT Pub. No.: WO2014/038343
PCT Pub. Date: Mar. 13, 2014

(65) Prior Publication Data
US 2015/0221451 A1    Aug. 6, 2015

(30) Foreign Application Priority Data

Sep. 4, 2012 (JP) ................................. 2012-194378

(51) Int. Cl.
| | |
|---|---|
| H01G 11/54 | (2013.01) |
| H01M 10/0568 | (2010.01) |
| H01M 10/0569 | (2010.01) |
| H01G 11/60 | (2013.01) |
| H01M 10/05 | (2010.01) |
| H01G 11/62 | (2013.01) |
| H01G 11/64 | (2013.01) |

(52) U.S. Cl.
CPC ............ *H01G 11/60* (2013.01); *H01G 11/62* (2013.01); *H01G 11/64* (2013.01); *H01M 10/05* (2013.01); *H01M 10/0568* (2013.01); *H01M 10/0569* (2013.01); *Y02E 60/13* (2013.01)

(58) Field of Classification Search
CPC .............................. H01G 9/035; H01G 9/038
See application file for complete search history.

(56) References Cited

U.S. PATENT DOCUMENTS

| | | | | |
|---|---|---|---|---|
| 5,426,208 A | * | 6/1995 | Himes ................... | C07C 253/34 558/435 |
| 8,961,809 B2 | * | 2/2015 | Gadkaree ............. | C07D 487/10 252/62.2 |
| 2004/0130852 A1 | * | 7/2004 | Matsumoto ........... | H01G 9/038 361/503 |
| 2012/0107689 A1 | | 5/2012 | Takahashi et al. | |
| 2013/0075647 A1 | * | 3/2013 | Gadkaree ............... | H01G 9/035 252/62.2 |
| 2013/0222976 A1 | | 8/2013 | Takahashi et al. | |

FOREIGN PATENT DOCUMENTS

| | | |
|---|---|---|
| EP | 1 562 890 A1 | 8/2005 |
| EP | 2 072 496 A1 | 6/2009 |
| JP | 8-37024 A | 2/1996 |
| JP | 2000-124077 A | 4/2000 |
| JP | 2000-311839 A | 11/2000 |
| JP | 2004-186246 A | 7/2004 |
| JP | 2007-106753 A | 4/2007 |
| JP | 2008-277401 A | 11/2008 |
| WO | 93/23366 A1 | 11/1993 |
| WO | 2012/063622 A1 | 5/2012 |

OTHER PUBLICATIONS

International Search Report for PCT/JP2013/071478 dated Nov. 12, 2013 [PCT/ISA/210].
International Preliminary Report on Patentability dated Mar. 19, 2015 from the International Searching Authority in corresponding application No. PCT/JP2013/071478.
Machine Translation of JP 2008-277401.
Communication dated Jun. 22, 2016 from the European Patent Office in counterpart Application No. 13835319.8.

\* cited by examiner

*Primary Examiner* — Carol M Koslow
(74) *Attorney, Agent, or Firm* — Sughrue Mion, PLLC

(57) ABSTRACT

The present invention aims to provide an electrolyte solution that is less likely to lead to an increase in resistance and realizes high capacity retention factor even after continuous application of a high voltage, and to provide an electrochemical device. The present invention provides an electrolyte solution including: a nitrile compound; and a quaternary ammonium salt, the electrolyte solution having a potassium ion content of less than 10 ppm, a moisture content of 20 ppm or less, a tertiary amine content of 30 ppm or less, a heterocyclic compound content of 30 ppm or less, and an ammonia content of 20 ppm or less.

12 Claims, No Drawings

ELECTROLYTE SOLUTION AND ELECTROCHEMICAL DEVICE

CROSS REFERENCE TO RELATED APPLICATIONS

This application is a National Stage of International Application No. PCT/JP2013/071478, filed on Aug. 8, 2013, which claims priority from Japanese Patent Application No. 2012-194378, filed on Sep. 4, 2012, the contents of all of which are incorporated herein by reference in their entirety.

TECHNICAL FIELD

The present invention relates to an electrolyte solution and an electrochemical device including the electrolyte solution.

BACKGROUND ART

As electrolyte solutions for electrochemical devices such as electrical double layer capacitors, those obtained by dissolving quaternary ammonium salts or the like in organic solvents such as cyclic carbonates (e.g., propylene carbonate) or nitrile compounds (see Patent Literature 1) are often used. Impurities contained in such electrolyte solutions are known to possibly cause an adverse effect on characteristics of electrochemical devices by, for example, reducing the voltage resistance or capacity of the electrochemical devices. To solve the problem, various studies have been made for reducing impurities contained in electrolyte solutions.

One example disclosed is an electrical double layer capacitor including a nonaqueous electrolyte solution prepared by dissolving a quaternary ammonium salt in a cyclic carbonate, the nonaqueous electrolyte solution containing 30 ppm or less of glycols, 30 ppm or less of monovalent alcohols, and less than 20 ppm of tertiary amines as impurities (see Patent Literature 2).

Another example disclosed is an electrolyte solution for electrochemical capacitors prepared by dissolving an electrolyte salt mainly containing a quaternary ammonium salt in a nonaqueous solvent, wherein the concentration of tertiary amines and tertiary ammonium salts in total is 2 mmol/kg or less (see Patent Literature 3).

CITATION LIST

Patent Literature

Patent Literature 1: JP-A 2000-124077
Patent Literature 2: JP-A 2004-186246
Patent Literature 3: JP-A 2000-311839

SUMMARY OF INVENTION

Technical Problem

As mentioned above, conventionally known techniques for improving the characteristics of electrochemical devices (e.g., electrical double layer capacitors) are related to reducing specific impurities contained in electrolyte solutions. A techniques demanded now is one allowing the characteristics of electrochemical devices to be maintained at a high level even under higher voltage.

The present invention devised in consideration of the state of the art aims to provide an electrolyte solution that is less likely to lead to an increase in resistance and realizes high capacity retention factor even after continuous application of a high voltage, and to provide an electrochemical device.

Solution to Problem

The present inventors found that reducing the amount of potassium ions, moisture, tertiary amines, heterocyclic compounds, and ammonia to a particular level in an electrolyte solution containing a nitrile compound and a quaternary ammonium salt can sufficiently suppress increase in resistance and sufficiently improve the capacity retention factor even under high voltage in an obtainable electrochemical device, thereby completing the present invention.

Specifically, the present invention relates to an electrolyte solution including: a nitrile compound; and a quaternary ammonium salt, the electrolyte solution having a potassium ion content of less than 10 ppm, a moisture content of 20 ppm or less, a tertiary amine content of 30 ppm or less, a heterocyclic compound content of 30 ppm or less, and an ammonia content of 20 ppm or less.

The quaternary ammonium salt is preferably triethylmethylammonium tetrafluoroborate, tetraethylammonium tetrafluoroborate, or Spiro bipyridinium tetrafluoroborate.

The nitrile compound is preferably acetonitrile.

The electrolyte solution of the present invention preferably further contains a sulfolane compound.

The electrolyte solution of the present invention preferably further contains a fluorine-containing ether.

The quaternary ammonium salt preferably has a concentration of 0.1 to 2.5 mol/l.

The electrolyte solution of the present invention is preferably for an electrochemical device.

The electrolyte solution of the present invention is preferably for an electrical double layer capacitor.

The present invention also relates to an electrochemical device including the electrolyte solution, a positive electrode, and a negative electrode.

The electrochemical device of the present invention is preferably an electrical double layer capacitor.

Advantageous Effects of Invention

The present invention provides an electrolyte solution that is less likely to lead to an increase in resistance and realizes high capacity retention factor even after continuous application of a high voltage, and an electrochemical device.

DESCRIPTION OF EMBODIMENTS

The electrolyte solution of the present invention contains a nitrile compound and a quaternary ammonium salt.

The nitrile compound may be, for example, a nitrile compound represented by the following formula (I):

$$R^1-(CN)_n \quad (I)$$

wherein $R^1$ represents a C1-C10 alkyl group or a C1-C10 alkylene group; and n is an integer of 1 or 2.

In the case that n is 1 in the formula (I), $R^1$ is a C1-C10 alkyl group, whereas in the case that n is 2, $R^1$ is a C1-C10 alkylene group.

Examples of the alkyl group include C1-C10 alkyl groups such as a methyl group, an ethyl group, a propyl group, an isopropyl group, a butyl group, an isobutyl group, a tert-butyl group, a pentyl group, a neopentyl group, a hexyl group, a heptyl group, an octyl group, a nonyl group, and a decyl group. Preferable among these are a methyl group and an ethyl group.

Examples of the alkylene group include C1-C10 alkylene groups such as a methylene group, an ethylene group, a propylene group, a butylene group, a pentylene group, a hexylene group, an octylene group, a nonylene group, and a decylene group. Preferable among these are a propylene group and an ethylene group.

Specific examples of the nitrile compound include acetonitrile ($CH_3$—CN), propionitrile ($CH_3$—$CH_2$—CN), and glutaronitrile (NC—$(CH_2)_3$—CN). Preferable among these are acetonitrile and propionitrile due to their low resistance, and particularly preferred is acetonitrile.

The nitrile compound in the electrolyte solution of the present invention preferably constitutes 50 to 100% by volume, more preferably 60 to 100% by volume, and still more preferably 70 to 100% by volume of the solvent constituting the electrolyte solution.

Examples of the quaternary ammonium salt are mentioned below.

(IIA) Tetraalkyl Quaternary Ammonium Salt

Preferable examples thereof include a tetraalkyl quaternary ammonium salt represented by the formula (IIA):

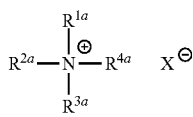

wherein $R^{1a}$, $R^{2a}$, $R^{3a}$, and $R^{4a}$ may be the same as or different from one another, and each are a C1-C6 alkyl group that may have an ether bond; and $X^-$ is an anion. Further, it is also preferable that part or all of the hydrogen atoms in this ammonium salt is/are replaced by a fluorine atom and/or a C1-C4 fluorine-containing alkyl group because the oxidation resistance can be improved.

Specific examples thereof include:

a tetraalkyl quaternary ammonium salt represented by the formula (IIA-1):

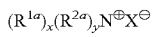

wherein $R^{1a}$, $R^{2a}$, and $X^-$ each are defined as in the formula (IIA); and x and y may be the same as or different from each other and each are an integer of 0 to 4, provided that x+y=4; and an alkyl ether group-containing trialkyl ammonium salt represented by the formula (IIA-2):

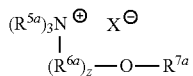

wherein $R^{5a}$ is a C1-C6 alkyl group; $R^{6a}$ is a divalent C1-C6 hydrocarbon group; $R^{7a}$ is a C1-C4 alkyl group; z is 1 or 2; and $X^-$ is an anion. Introduction of an alkyl ether group can reduce the viscosity.

The anion $X^-$ may be an inorganic anion or may be an organic anion. Examples of the inorganic anion include $AlCl_4^-$, $BF_4^-$, $PF_6^-$, $AsF_6^-$, $TaF_6^-$, $I^-$, and $SbF_6^-$. Examples of the organic anion include $CF_3COO^-$, $CF_3SO_3^-$, $(CF_3SO_2)_2N^-$, and $(C_2F_5SO_2)_2N^-$.

Preferable among these are $BF_4^-$, $PF_6^-$, $AsF_6^-$, and $SbF_6^-$ for good oxidation resistance and ionic dissociation.

Specific, preferable examples of the tetraalkyl quaternary ammonium salt include $Et_4NBF_4$, $Et_4NClO_4$, $Et_4NPF_6$, $Et_4NAsF_6$, $Et_4NSbF_6$, $Et_4NCF_3SO_3$, $Et_4N(CF_3SO_2)_2N$, $Et_4NC_4F_9SO_3$, $Et_3MeNBF_4$, $Et_3MeNClO_4$, $Et_3MeNPF_6$, $Et_3MeNAsF_6$, $Et_3MeNSbF_6$, $Et_3MeNCF_3SO_3$, $Et_3MeN(CF_3SO_2)_2N$, $Et_3MeNC_4F_9SO_3$, and an N,N-diethyl-N-methyl-N-(2-methoxyethyl) ammonium salt. Particularly preferable are $Et_4NBF_4$, $Et_4NPF_6$, $Et_4NSbF_6$, $Et_4NAsF_6$, $Et_3MeNBF_4$, and an N,N-diethyl-N-methyl-N-(2-methoxyethyl) ammonium salt.

(IIB) Spirobipyridinium Salt

Preferable examples thereof include a spirobipyridinium salt represented by the formula (IIB):

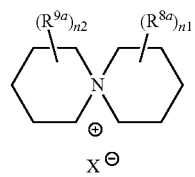

wherein $R^{8a}$ and $R^{9a}$ may be the same as or different from each other, and each are a C1-C4 alkyl group; $X^-$ is an anion; n1 is an integer of 0 to 5; and n2 is an integer of 0 to 5. Further, it is also preferable that part or all of the hydrogen atoms in this spirobipyridinium salt is/are replaced by a fluorine atom and/or a C1-C4 fluorine-containing alkyl group because the oxidation resistance can be improved.

Specific, preferable examples of the anion $X^-$ are the same as those for the salt (IIA).

For example, the following compound:

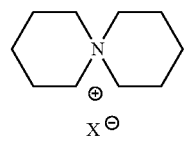

may be mentioned as one specific, preferable example.

This spirobipyridinium salt is excellent in solubility, oxidation resistance, and ionic conductivity.

(IIC) Imidazolium Salt

Preferable examples thereof include an imidazolium salt represented by the formula (IIC):

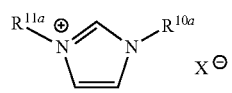

wherein $R^{10a}$ and $R^{11a}$ may be the same as or different from each other, and each are a C1-C6 alkyl group; and $X^-$ is an anion. Further, it is also preferable that part or all of the hydrogen atoms in this imidazolium salt is/are replaced by a fluorine atom and/or a C1-C4 fluorine-containing alkyl group because the oxidation resistance can be improved.

Specific, preferable examples of the anion $X^-$ are the same as those for the salt (IIA).

For example, the following compound:

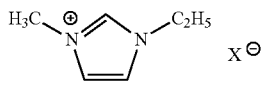

may be mentioned as one preferable, specific example.

This imidazolium salt is excellent in that it has low viscosity and good solubility.

(IID) N-Alkylpyridinium Salt

Preferable examples thereof include an N-alkylpyridinium salt represented by the formula (IID):

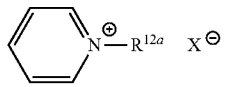

wherein $R^{12a}$ is a C1-C6 alkyl group; and $X^-$ is an anion. Further, it is also preferable that part or all of the hydrogen atoms in this N-alkylpyridinium salt is/are replaced by a fluorine atom and/or a C1-C4 fluorine-containing alkyl group because the oxidation resistance can be improved.

Specific, preferable examples of the anion $X^-$ are the same as those for the salt (IIA).

For example, the following compounds:

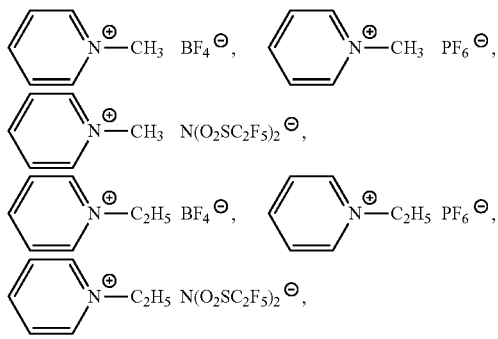

may be mentioned as preferable, specific examples.

This N-alkylpyridinium salt is excellent in that it has low viscosity and good solubility.

(IIE) N,N-Dialkylpyrrolidinium Salt

Preferable examples thereof include an N,N-dialkylpyrrolidinium salt represented by the formula (IIE):

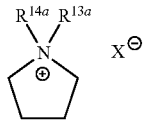

wherein $R^{13a}$ and $R^{14a}$ may be the same as or different from each other, and each are a C1-C6 alkyl group; and $X^-$ is an anion. Further, it is also preferable that part or all of the hydrogen atoms in this N,N-dialkylpyrrolidinium salt is/are replaced by a fluorine atom and/or a C1-C4 fluorine-containing alkyl group because the oxidation resistance can be improved.

Specific, preferable examples of the anion $X^-$ are the same as those for the salt (IIA).

For example, the following compounds:

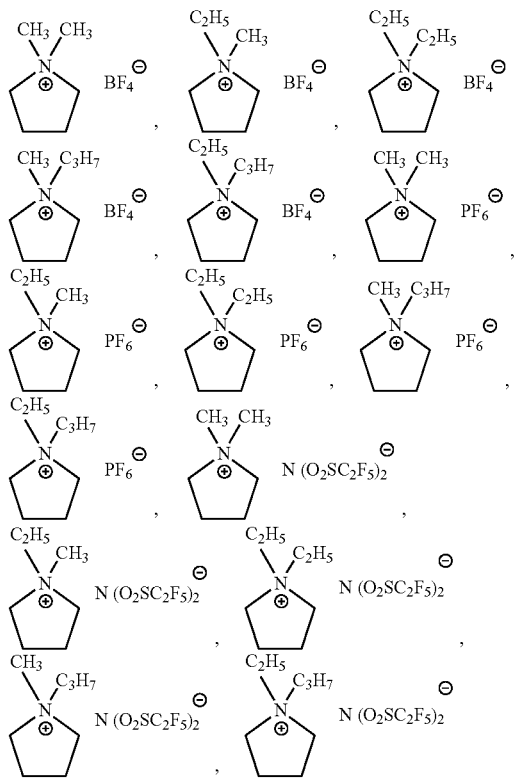

may be mentioned as preferable, specific examples.

This N,N-dialkylpyrrolidinium salt is excellent in that it has low viscosity and good solubility.

Preferable among these ammonium salts are salts (IIA), (IIB), and (IIC) for their good solubility, oxidation resistance, and ionic conductivity, and more preferable are compounds represented by the following formulas:

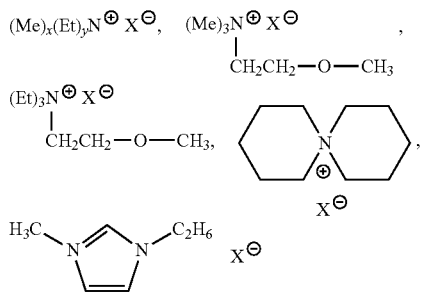

wherein Me represents a methyl group; Et represents an ethyl group; and $X^-$, x, and y are the same as those defined in the formula (IIA-1).

Among these, preferred as the quaternary ammonium salt are triethylmethylammonium tetrafluoroborate, tetraethylammonium tetrafluoroborate, and Spiro bipyridinium tetrafluoroborate.

The concentration of the quaternary ammonium salt is preferably 0.1 to 2.5 mol/l, though it depends on the required current density, applications, and the kind of the quaternary ammonium salt. The concentration is more preferably 0.5 to 2.5 mol/l and still more preferably 1.0 to 2.5 mol/l.

In the electrolyte solution of the present invention, the potassium ion content is less than 10 ppm, the moisture content is 20 ppm or less, the tertiary amine content is 30 ppm or less, the heterocyclic compound content is 30 ppm or less, and the ammonia content is 20 ppm or less. If any of these impurities are contained in an amount of not within the above range, in an obtainable electrochemical device, the resistance may be increased or the capacity retention factor may be reduced under high voltage.

The present inventors found that the potassium ions are dissolved out from a desiccant (e.g., zeolite) in the step of dehydrating the nitrile compound. The potassium ion content in the electrolyte solution is preferably less than 5 ppm, more preferably less than 3 ppm, and particularly preferably less than 1 ppm.

The potassium ion content can be measured by atomic absorption spectrophotometry or ICP. The value measured by atomic absorption spectrophotometry is employed here.

The moisture is mainly derived from residual moisture in the nitrile compound and the quaternary ammonium salt. The moisture content in the electrolyte solution is preferably 10 ppm or less and particularly preferably 6 ppm or less.

The moisture content can be measured by the Karl Fischer method.

The tertiary amines are mainly derived from unreacted raw materials of the quaternary ammonium salt. The quaternary ammonium salt is prepared by quaternarization of tertiary amines with use of carbonic diester. If purification is insufficient in this reaction, unreacted tertiary amines may remain.

Examples of the tertiary amines include trimethylamine, ethyl dimethylamine, diethyl methylamine, triethylamine, tributylamine, N-methyl pyrrolidine, N-ethyl pyrrolidine, N-methylimidazole, and N-ethylimidazole.

The tertiary amines herein encompass tertiary amine salts produced by bonding the tertiary amines to protonic acids in the electrolyte solution.

The tertiary amine content in the electrolyte solution is preferably less than 20 ppm, more preferably less than 15 ppm, and particularly preferably less than 10 ppm.

The tertiary amine content, can be measured by liquid chromatography, ion chromatography, capillary electrophoresis, or the like. The value measured by ion chromatography is employed here.

The heterocyclic compound and ammonia are compounds possibly contained as impurities in the nitrile compound.

Examples of the heterocyclic compound include oxazole.

The heterocyclic compound content in the electrolyte solution is preferably 10 ppm or less, more preferably 5 ppm or less, and particularly preferably 1 ppm or less.

The heterocyclic compound content can be measured by ion chromatography.

The ammonia content in the electrolyte solution is preferably 10 ppm, more preferably 5 ppm or less, and particularly preferably 1 ppm or less.

The ammonia content can be measured by ion chromatography.

The electrolyte solution of the present invention preferably further contains a sulfolane compound from the standpoint of improving the durability of an obtainable electrochemical device under higher voltage (e.g., 3 V or higher).

The sulfolane compound may be a fluorine-free sulfolane compound or a fluorine-containing sulfolane compound.

Examples of the fluorine-free sulfolane compound include, in addition to sulfolane, fluorine-free sulfolane derivatives represented by the following formula:

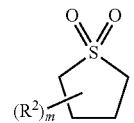

wherein $R^2$ represents a C1-C4 alkyl group and m represents an integer of 1 or 2.

Among these, preferred are the following sulfolane and sulfolane derivatives:

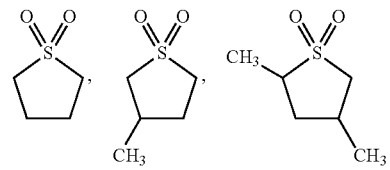

Examples of the fluorine-containing sulfolane compound include the fluorine-containing sulfolane compound disclosed in JP-A 2003-132944. Among these, those represented by the following formulas:

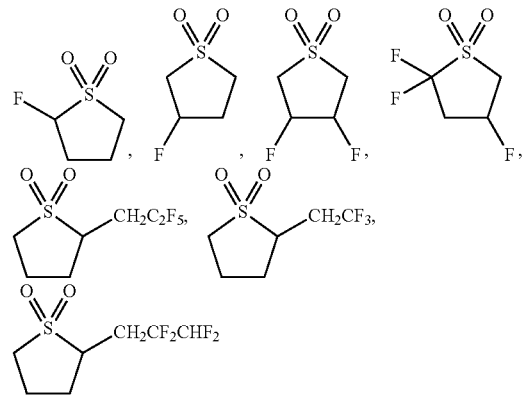

are preferred.

Among these, preferred as the sulfolane compound are sulfolane, 3-methylsulfolane, and 2,4-dimethylsulfolane, and particularly preferred is sulfolane.

The electrolyte solution of the present invention may further contain a fluorine-containing ether.

Examples of the fluorine-containing ether include fluorine-containing chain ethers (Ia) and fluorine-containing cyclic ethers (Ib).

Examples of the fluorine-containing chain ether (Ia) include compounds disclosed in JP-A 08-37024, JP-A 09-97627, JP-A 11-26015, JP-A 2000-294281, JP-A 2001-52737, JP-A 11-307123 and the like.

Among these, preferred as the fluorine-containing chain ether (Ia) are fluorine-containing chain ethers represented by Formula (Ia-1):

$$Rf^1\text{—}O\text{—}Rf^2 \qquad (Ia\text{-}1)$$

wherein $Rf^1$ represents a C1-C10 fluoroalkyl group, and $Rf^2$ represents a C1-C4 alkyl group optionally containing a fluorine atom.

If the $Rf^2$ represents a fluorine-containing alkyl group in Formula (Ia-1), compared to a case where the $Rf^2$ represents a fluorine-free alkyl group, such chain fluorine-containing ether is preferable because not only of its especially excellent oxidation resistance and compatibility with electrolyte salts, but also of its high decomposition voltage and its low freezing point that allows maintenance of low-temperature characteristics.

Examples of the $Rf^1$ include C1-C10 fluoroalkyl groups such as $HCF_2CF_2CH_2$—, $HCF_2CF_2CF_2CH_2$—, $HCF_2CF_2CF_2CF_2CH_2$—, $C_2F_5CH_2$—, $CF_3CFHCF_2CH_2$—, $HCF_2CF(CF_3)CH_2$—, $C_2F_5CH_2CH_2$—, and $CF_3CH_2CH_2$—. Among these, preferred are C3-C6 fluoroalkyl groups.

Examples of the $Rf^2$ include fluorine-free C1-C4 alkyl groups, —$CF_2CF_2H$, —$CF_2CFHCF_3$, —$CF_2CF_2CF_2H$, —$CH_2CH_2CF_3$, —$CH_2CFHCF_3$, and —$CH_2CH_2C_2F_5$. Among these, preferred are fluorine-containing C2-C4 alkyl groups.

Particularly preferably, in Formula (Ia-1), $Rf^1$ represents a fluorine-containing C3-C4 alkyl group and $Rf^2$ represents a fluorine-containing C2-C3 alkyl group in terms of favorable ion conductivity.

Specifically, the fluorine-containing chain ether (Ia) may be one or two or more of $HCF_2CF_2CH_2OCF_2CF_2H$, $CF_3CF_2CH_2OCF_2CF_2H$, $HCF_2CF_2CH_2OCF_2CFHCF_3$, $CF_3CF_2CH_2OCF_2CFHCF_3$, $HCF_2CF_2CH_2OCH_2CFHCF_3$, and $CF_3CF_2CH_2OCH_2CFHCF_3$. Among these, particularly preferred are $HCF_2CF_2CH_2OCF_2CF_2H$, $HCF_2CF_2CH_2OCF_2CFHCF_3$, $CF_3CF_2CH_2OCF_2CFHCF_3$, and $CF_3CF_2CH_2OCF_2CF_2H$ in terms of high decomposition voltage and maintenance of low-temperature characteristics.

As examples of the fluorine-containing cyclic ether (Ib), those represented by the following formulas:

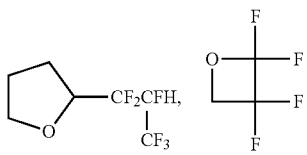

may be mentioned.

The electrolyte solution of the present invention may further contain other solvent(s) such as cyclic carbonates (Ic) and chain carbonates (Id), if needed.

The cyclic carbonate (Ic) may be a fluorine-free cyclic carbonate or a fluorine-containing cyclic carbonate.

Examples of the fluorine-free cyclic carbonate include ethylene carbonate (EC), propylene carbonate (PC), and vinylenecarbonate. In particular, from the standpoint of reducing the internal resistance and maintaining the low-temperature characteristics, preferred is propylene carbonate (PC).

Examples of the fluorine-containing cyclic carbonate include mono-, di-, tri-, and tetra-fluoroethylene carbonates and trifluoromethyl ethylene carbonate. Among these, from the standpoint of improving the voltage resistance of an obtainable electrochemical device, preferred is trifluoromethyl ethylene carbonate.

The chain carbonate (Id) may be a fluorine-free chain carbonate or a fluorine-containing chain carbonate.

Examples of the fluorine-free chain carbonate include dimethyl carbonate (DMC), diethyl carbonate (DEC), ethyl methyl carbonate (EMC), methyl isopropyl carbonate (MIPC), ethyl isopropyl carbonate (EIPC), and 2,2,2-trifluoroethyl methyl carbonate (TFEMC). Among these, from the standpoint of reducing the internal resistance and maintaining the low-temperature characteristics, preferred is dimethyl carbonate (DMC).

Examples of the fluorine-containing chain carbonate include fluorine-containing chain carbonates represented by Formula (Id-1):

wherein $Rf^{1a}$ has a moiety represented by the formula:

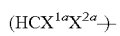

(in the formula, $X^{1a}$ and $X^{2a}$ are the same as or different from each other and each represent a hydrogen atom or a fluorine atom) at an end and having a fluorine content of 10 to 76% by mass or an alkyl group, and preferably a C1-C3 alkyl group, $Rf^{2a}$ is a fluoroalkyl group having a moiety represented by the above formula or $CF_3$ at an end and having a fluorine content of 10 to 76% by mass;

fluorine-containing chain carbonates represented by Formula (Id-2):

wherein $Rf^{1b}$ represents a fluorine-containing alkyl group having an ether bond, which has —$CF_3$ at an end and has a fluorine content of 10 to 76% by mass, $Rf^{2b}$ represents a fluorine-containing alkyl group having an ether bond or a fluorine-containing alkyl group, which have a fluorine content of 10 to 76% by mass; and fluorine-containing chain carbonates represented by Formula (Id-3):

wherein $Rf^{1c}$ represents a fluorine-containing alkyl group having an ether bond, which has a moiety represented by the formula:

(in the formula, $X^{1c}$ represents a hydrogen atom or a fluorine atom) at an end and has a fluorine content of 10 to 76% by mass; $R^{2c}$ represents an alkyl group in which a hydrogen atom may be substituted with a halogen atom and a hetero atom may be contained in the chain.

Specific examples of a usable fluorine-containing chain carbonate include chain carbonates in which fluorine-containing groups are combined, represented by Formula (Id-4):

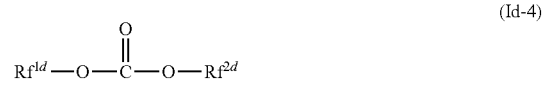

wherein $Rf^{1d}$ and $Rf^{2d}$ each represent $H(CF_2)_2CH_2-$, $FCH_2CF_2CH_2-$, $H(CF_2)_2CH_2CH_2-$, $CF_3CF_2CH_2-$, $CF_3CH_2CH_2-$, $CF_3CF(CF_3)CH_2CH_2-$, $C_3F_7OCF(CF_3)CH_2-$, $CF_3OCF(CF_3)CH_2-$, $CF_3OCF_2-$, or the like.

Among the fluorine-containing chain carbonates, from the standpoint of reducing the internal resistance and maintaining the low-temperature characteristics, the following compounds are preferred:

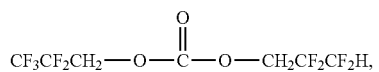

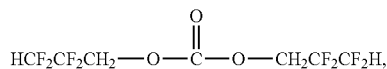

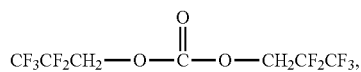

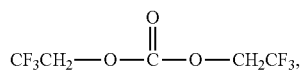

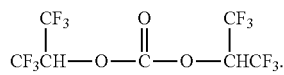

In addition, the following compounds are also usable as the fluorine-containing chain carbonate:

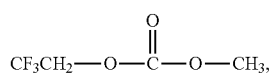

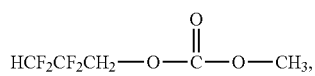

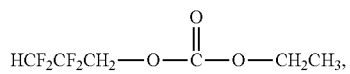

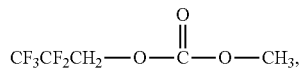

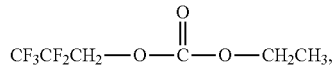

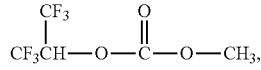

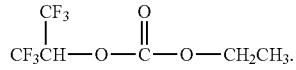

Examples of other usable solvents, other than the cyclic carbonate (Ic) and the chain carbonate (Id) include fluorine-free or fluorine-containing lactones represented by the formulas:

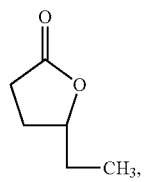 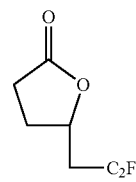 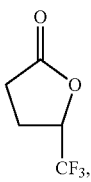

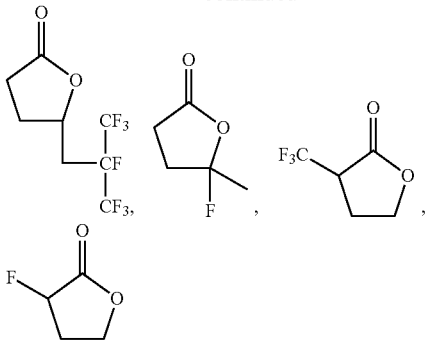

and furans, oxolanes, and the like.

In a case where the electrolyte solution of the present invention contains solvent(s) other than the nitrile compound, the amount of the solvent(s) is preferably less than 50% by volume, more preferably less than 40% by volume, and still more preferably less than 30% by volume in the electrolyte solution.

In a case where the sulfolane compound is added to the electrolyte solution of the present invention, the amount of the sulfolane compound is preferably less than 50% by volume, more preferably less than 40% by volume, still more preferably less than 30% by volume, and particularly preferably less than 20% by volume in the electrolyte solution. The amount of the sulfolane compound is preferably 5% by volume or more in the electrolyte solution. Addition of the sulfolane compound in an amount within the above range is preferable as it improves the long-term reliability.

In a case where the fluorine-containing ether is added to the electrolyte solution of the present invention, the volume ratio between the fluorine-containing ether and the nitrile compound is preferably 90/10 to 1/99, more preferably 40/60 to 1/99, and still more preferably 30/70 to 1/99. When the volume ratio is within this range, the withstand voltage can be maintained and the effect of reducing the internal resistance can be enhanced.

The electrolyte solution of the present invention may further contain other electrolyte salt(s) in addition to the quaternary ammonium salt.

A lithium salt may be used as other electrolyte salt(s). Preferable examples of the lithium salt include $LiPF_6$, $LiBF_4$, $LiAsF_6$, $LiSbF_6$, and $LiN(SO_2C_2H_5)_2$.

In order to further improve the capacity, a magnesium salt may be used. Preferable examples of the magnesium salt include $Mg(ClO_4)_2$ and $Mg(OOC_2H_5)_2$.

The electrolyte solution of the present invention is prepared by dissolving the quaternary ammonium salt in the nitrile compound. In a conventional technique, for concurrent removal of moisture from the nitrile compound and from the quaternary ammonium salt, the quaternary ammonium salt is first dissolved in the nitrile compound, and the resulting solution is added to a desiccant such as zeolite for dehydration thereof. In this method, however, potassium ions are likely to be dissolved out from the desiccant, though moisture is easily removed. As a result, the resulting electrolyte solution problematically contains a considerable amount of potassium ions. Especially, such tendency is significant in a case where the quaternary ammonium salt is triethylmethylammonium tetrafluoroborate or tetraethylammonium tetrafluoroborate.

In the electrolyte solution of the present invention, the moisture content is reduced to 20 ppm or less and the potassium ion content is also reduced to a low level of less than 10 ppm. An exemplary method of effectively removing both the potassium ions and moisture include separately dehydrating the quaternary ammonium salt and the nitrile compound in advance and then dissolving the quaternary ammonium salt in the nitrile compound.

Specifically, the electrolyte solution of the present invention can be prepared by a method including steps of dehydrating a quaternary ammonium salt, dehydrating a nitrile compound, and dissolving the quaternary ammonium salt in the nitrile compound.

The method of dehydrating the quaternary ammonium salt is not particularly limited, and may be a conventionally known method such as heat-drying.

The method of dehydrating the nitrile compound is not particularly limited, and is preferably bringing the nitrile compound into contact with a desiccant. The desiccant is not particularly limited as long as it does not react with components of the electrolyte solution (e.g., additives such as solvents, electrolyte salts, and flame retardants) and does not remove (adsorb or the like) the components. Examples thereof include natural zeolite and synthetic zeolite (molecular sieve).

In a case where other solvent(s) is(are) used in combination with the nitrile compound, dehydration with a desiccant may be performed on a mixed solvent of the nitrile compound and other solvent(s). Alternatively, the nitrile compound and other solvent(s) may be dehydrated separately and then mixed together.

The amount of the desiccant is not particularly limited, and is preferably 1 to 50 parts by mass for 100 parts by mass of the solvent to be dehydrated.

The method of dissolving the dehydrated quaternary ammonium salt in the dehydrated nitrile compound (and optionally other solvent(s)) is not particularly limited as long as additional contamination of moisture can be prevented, and may be a conventionally known method.

Further, the electrolyte solution of the present invention may be a gel electrolyte solution gelated (plasticized) in combination with a polymer material that is dissolved into the nitrile compound or is swelled by the nitrile compound.

Examples of the polymer material include conventionally known polyethylene oxide and polypropylene oxide, modified products thereof (JP 8-222270 A, JP 2002-100405 A); polyacrylate-based polymers, polyacrylonitrile, and fluororesins such as polyvinylidene fluoride and vinylidene fluoride-hexafluoropropylene copolymers (JP 4-506726 T, JP 8-507407 T, JP 10-294131 A); and complexes of any of such fluororesins and any of hydrocarbon resins (JP 11-35765 A, JP 11-86630 A). In particular, it is preferable to use polyvinylidene fluoride or a vinylidene fluoride-hexafluoropropylene copolymer as a polymer material for a gel electrolyte solution.

In addition, an ion-conducting compound disclosed in JP 2006-114401 A may also be used.

This ion-conducting compound is an amorphous fluorine-containing polyether compound which has a fluorine-containing group in its side chain and which is represented by the formula (1-1):

P-(D)-Q    (1-1)

wherein D is represented by the formula (2-1):

-(D1)$_n$-(FAE)$_m$-(AE)$_p$-(Y)$_q$—    (2-1)

wherein

D1 is an ether unit which has, in its side chain, a fluorine-containing organic group having an ether bond and which is represented by the formula (2a):

(2a)

(wherein Rf is a fluorine-containing organic group having an ether bond that may have a cross-linkable functional group; and $R^{15a}$ is a group or an atomic bonding that couples Rf with the main chain);

FAE is an ether unit which has a fluorine-containing alkyl group in its side chain and which is represented by the formula (2b):

(2b)

(wherein Rfa is a hydrogen atom or a fluorine-containing alkyl group that may have a cross-linkable functional group; and $R^{16a}$ is a group or an atomic bonding coupling Rfa with the main chain);

AE is an ether unit represented by the formula (2c):

(2c)

(wherein $R^{18a}$ is a hydrogen atom or an alkyl group that may have a cross-linkable functional group, an alicyclic hydrocarbon group that may have a cross-linkable functional group, or an aromatic hydrocarbon group that may have a cross-linkable functional group; and $R^{17a}$ is a group or an atomic bonding coupling $R^{18a}$ with the main chain);

Y is at least one unit represented by the formulas (2d-1) to (2d-3):

(2d-1)

(2d-2)

(2d-3)

n is an integer of 0 to 200; m is an integer of 0 to 200; p is an integer of 0 to 10000; and q is an integer of 1 to 100, provided that n+m is not 0, and the order of bonding of D1, FAE, AE, and Y is not defined); and P and Q may be the same as or different from each other, and each are a hydrogen atom, an alkyl group that may contain a fluorine atom and/or a cross-linkable functional group, a phenyl group that may contain a fluorine atom and/or a cross-linkable functional group, a —COOH group, —OR$^{19a}$ (wherein R$^{19a}$ is a hydrogen atom or an alkyl group that may contain a fluorine atom and/or a cross-linkable functional group), an ester group, or a carbonate group (if the terminal of D is an oxygen atom, P and Q both are none of a —COOH group, —OR$^{19a}$, an ester group, and a carbonate group).

The electrolyte solution of the present invention may contain another additive. Examples of such an additive include metal oxides and glass. These may be used to the extent that they do not impair the effects of the present invention.

Preferably, the electrolyte solution of the present invention does not freeze at low temperature (e.g., 0° C., –20° C.) and the electrolyte salt does not precipitate. Specifically, the viscosity at 0° C. is preferably 100 mPa·s or lower, more preferably 30 mPa·s or lower, and particularly preferably 15 mPa·s or lower. Further, specifically, the viscosity at –20° C. is preferably 100 mPa·s or lower, more preferably 40 mPa·s or lower, and particularly preferably 15 mPa·s or lower.

The electrolyte solution of the present invention is preferably a nonaqueous electrolyte.

The electrolyte solution of the present invention is usable as an electrolyte solution for various electrochemical devices provided with an electrolyte solution. Examples of the electrochemical device include electrical double layer capacitors, lithium secondary batteries, radical batteries, solar cells (especially, dye sensitized solar cells), fuel cells, various electrochemical sensors, electrochromic elements, electrochemical switching elements, aluminum electrolytic capacitor, and tantalum electrolytic capacitor. Among these, the electrolyte solution of the present invention is suitably used for electrical double layer capacitors and lithium secondary batteries, and more suitably for electrical double layer capacitors. Moreover, the electrolyte solution of the present invention is also usable as an ion conductor of an antistatic coating material.

The electrolyte solution of the present invention is preferably for an electrochemical device, and particularly preferably for an electrical double layer capacitor.

An electrochemical device including the electrolyte solution of the present invention, a positive electrode, and an negative electrode is also encompassed by the present invention. Those listed above may be exemplified as the electrochemical device. In particular, preferred is an electrical double layer capacitor.

In the following, the configuration of an electrical double layer capacitor as the electrochemical device of the present invention is described in detail.

In the electric double layer capacitor of the present invention, at least one of the positive electrode and the negative electrode is preferably a polarizable electrode. The polarizable electrode and the non-polarizable electrode may be the following electrodes specifically disclosed in JP 9-7896 A.

The polarizable electrode may be a polarizable electrode mainly including active carbon, and it preferably contains inactive carbon with a large specific surface area and a conducting agent which imparts electronic conductivity, such as carbon black. The polarizable electrode can be formed by various methods. For example, a polarizable electrode comprising active carbon and carbon black can be formed by mixing powdered active carbon, carbon black, and a phenolic resin, press-molding the mixture, and then firing and activating the mixture in an inert gas atmosphere and in a vapor atmosphere. Preferably, this polarizable electrode is coupled with a current collector using a conductive adhesive, for example.

Alternatively, a polarizable electrode may be formed by kneading powdery active carbon, carbon black, and a binder in the presence of an alcohol, forming the mixture into a sheet, and then drying the sheet. This binder may be polytetrafluoroethylene, for example. Alternatively, a polarizable electrode integrated with a current collector may be formed by mixing powdery active carbon, carbon black, a binder, and a solvent into a slurry, coating a metal foil of a current collector with this slurry, and drying the coating.

A polarizable electrode mainly based on active carbon may be used for both electrodes to prepare an electric double layer capacitor. Further, a structure in which a non-polarizable electrode is used on one side may be accepted. Examples thereof include a structure in which a positive electrode mainly based on a cell active material such as a metal oxide and a negative electrode of a polarizable electrode mainly based on active carbon are used in combination; and a structure in which a negative electrode of metallic lithium or a lithium alloy and a polarizable electrode mainly based on active carbon are used in combination.

In place of or in combination with active carbon, a carbonaceous material may be used such as carbon black, graphite, expanded graphite, porous carbon, carbon nanotube, carbon nanohorn, and Ketjenblack.

The solvent used for the preparation of a slurry in the production of an electrode is preferably one that dissolves a binder. The solvent is appropriately selected from N-methylpyrrolidone, dimethyl formamide, toluene, xylene, isophorone, methyl ethyl ketone, ethyl acetate, methyl acetate, dimethyl phthalate, ethanol, methanol, butanol, and water depending on the type of binder.

Examples of the active carbon used for a polarizable electrode include phenol resin-based active carbon, coconut shell-based active carbon, and petroleum coke-based active carbon. Preferably used among these are petroleum coke-based active carbon and phenol resin-based active carbon because they provide a large capacity. Further, examples of a method for activating active carbon include a vapor activation method and a molten KOH activation method. It is preferable to use active carbon prepared by the molten KOH activation method for a larger capacity.

Examples of a preferable conducting agent used for a polarizable electrode include carbon black, Ketjenblack, acetylene black, natural graphite, artificial graphite, metal fibers, conductive titanium oxide, and ruthenium oxide. The amount of the conducting agent, such as carbon black, used for a polarizable electrode is preferably 1 to 50% by mass in the total amount of the conducting agent and the active carbon because such an amount of the conducting agent may provide good conductivity (low internal resistance), and a larger amount of the conducting agent may cause a reduced capacity of a product.

The active carbon used for a polarizable electrode is preferably active carbon with an average particle size of 20 µm or smaller and a specific surface area of 1500 to 3000 m$^2$/g in order to provide a large-capacity electric double layer capacitor with a low internal resistance.

The current collector needs to be corrosion resistable chemically and electrochemically. Preferable examples of the current collector of the polarizable electrode mainly based on active carbon include stainless steel, aluminum, titanium, and tantalum. Particularly preferable materials among these are stainless steel and aluminum in terms of both the characteristics and price of an electric double layer capacitor to be obtained.

Examples of commonly known electric double layer capacitors include rolled-up electric double layer capacitors, laminate electric double layer capacitors, and coin-shaped electric double layer capacitors, and the electric double layer capacitor of the present invention may have any of these structures.

For example, a rolled-up electric double layer capacitor may be produced as follows: a positive electrode and a negative electrode each having a laminate (electrode) of a current collector and an electrode layer are rolled up with a separator interposed therebetween to form a rolled-up element; this rolled-up element is put into a container made of, for example, aluminum; the container is charged with an electrolyte solution; and then the container is hermetically sealed with a rubber sealing material.

With respect to the separator, conventionally known materials and structures may also be used in the present invention. Examples thereof include polyethylene porous membrane and nonwoven fabric of polypropylene fibers, glass fibers, and cellulose fibers.

Alternatively, an electric double layer capacitor may be prepared, by a known method, as a laminate electric double layer capacitor in which sheet-shaped positive and negative electrodes are laminated with an electrolyte solution and a separator interposed therebetween, or a coin-shaped electric double layer capacitor in which a positive electrode and a negative electrode are fixed in a coin shape using a gasket with an electrolyte solution and a separator interposed therebetween.

In a case where the electrochemical device of the present invention is a device other than an electrical double layer capacitor, the structure thereof is not particularly limited, provided that the electrolyte solution used is the electrolyte solution of the present invention, and a conventionally known structure may be employed.

EXAMPLES

The following will describe the present invention referring to, but not limited to, examples and comparative examples.

The following measurement methods were used in the examples and comparative examples.

(1) Solids Concentration of Aqueous Dispersion or Organosol

An aqueous dispersion or an organosol of PTFE (10 g), for example, was collected in a Petri dish and heated at 150° C. for about three hours. Then, the solids content was weighed. Based on this solids content, the solids concentration was calculated as the ratio between the mass and the solids content of the aqueous dispersion or organosol.

(2) Average Particle Size

The solids content of a PTFE aqueous dispersion was adjusted to 0.15% by mass and the dispersion was charged into a cell. Then, 550-nm light was applied thereto, and thereby the transmittance at that time was determined. Further, the number average primary particle size was calculated based on the unidirectional particle diameter measured using a photograph by a transmission electron microscope. The correlation between the transmittance and the number average primary particle size was drawn into a calibration curve, and the average particle size was determined based on the obtained calibration curve and the transmittance measured for each sample.

(3) Standard Specific Gravity [SSG]

The SSG was measured by a water displacement method in accordance with ASTM D4895-89.

(4) Polymer Melting Point

A sample (3 mg) was subjected to measurement using a DSC device (SEIKO Holdings Corp.). The sample was heated to not lower than the melting point at an increasing rate of 10° C./min and then cooled down at the same rate, and again heated at the same rate as a second run. The melting peak in the second run was read, and this peak was defined as a melting point.

(5) Measurement of Compositional Ratio Between PTFE Particles and PVdF Particles in Organosol Composition by Solid-State NMR The organosol composition was vacuum-dried at 120° C., and the obtained sample was measured using a solid-state NMR device (BRUKER Corp.). The compositional ratio was calculated based on the ratio in area between the PTFE-derived peak and the PVdF-derived peak in the obtained spectrum.

(6) Potassium Ion Content of Electrolyte Solution

The potassium ion content was measured by atomic absorption spectrophotometry using 25010 manufactured by Hitachi, Ltd. The lower limit of detection was 1 ppb.

(7) Moisture Content of Electrolyte Solution

Under an atmosphere wherein the moisture content was adjusted to the dew point of −50 to −80° C., a sample of the electrolyte solution was subjected to measurement of the moisture content by the Karl Fischer method with a moisture detector (Karl Fischer Moisture Titrator manufactured by KYOTO ELECTRONICS MANUFACTURING CO., LTD.) at a temperature of 25° C. and at a dew point of −50° C. to −80° C.

(8) Tertiary Amine Content of Electrolyte Solution

The tertiary amine content was measured by ion chromatography with an ICS-2100 manufactured by Nippon Dionex K.K.

(9) Heterocyclic Compound Content of Electrolyte Solution

The heterocyclic compound content was measured by ion chromatography with an ICS-2100 manufactured by Nippon Dionex K.K.

(10) Ammonia Content of Electrolyte Solution

The ammonia content was measured by ion chromatography with an ICS-2100 manufactured by Nippon Dionex K.K.

Preparation 1 (Preparation of Aqueous Dispersion of PTFE Particles)

A 6-L-capacity SUS-made polymerization vessel equipped with a stirrer was charged with 3500 g of an aqueous solution obtained by dissolving an emulsifier $CF_3OCF(CF_3)CF_2OCF(CF_3)COONH_4$ in pure water to a concentration of 0.15% by mass and granular paraffin wax (100 g), and was then hermetically sealed. The atmosphere in the vessel was evacuated and replaced with nitrogen, and the vessel was then evacuated. Thereafter, tetrafluoroethylene (TFE) was put into the vessel until the pressure reached 0.7 MPaG while the mixture was stirred at 85° C. and 265 rpm. Next, a solution (20 g) of disuccinic acid peroxide (DSP) (525 mg) in water was injected under pressure into the vessel with nitrogen. In order to prevent the solution from remaining in the reaction pipe, water (20 g) was again injected under pressure into the pipe with nitrogen to wash the pipe. Then, the TFE pressure was adjusted to 0.8 MPa, and the stirring rate was maintained at 265 rpm and the internal temperature was maintained at 85° C. One hour after the DSP introduction, ammonium persulfate (APS) (19 mg) was dissolved in pure water (20 g), and the solution was injected under pressure into the vessel with nitrogen. In order to prevent the solution from remaining in the reaction pipe, water (20 g) was again injected under pressure into the pipe with nitrogen to wash the pipe. TFE was additionally put into the vessel to maintain the internal pressure at 0.8 MPa. When the amount of the additional monomer reached 1195 g, stirring was stopped. Then, the gas inside the vessel was blown and the reaction was terminated. The inside of the vessel was cooled down and the content was collected in a plastic container, and thereby an aqueous dispersion of PTFE particles was obtained. The solids concentration of the aqueous dispersion measured by a dry weight method was 31.4% by mass. Further, the average primary particle size of the aqueous dispersion was 0.29 μm.

The standard specific gravity and the melting point were measured as follows: the obtained aqueous dispersion of PTFE particles (500 ml) was diluted to have a solids concentration of about 15% by mass using deionized water; nitric acid (1 ml) was added and the mixture was stirred vigorously until coagulation; the obtained coagulation product was dried at 145° C. for 18 hours, and thereby PTFE powder was obtained. With respect to the obtained PTFE powder, the standard specific gravity [SSG] was 2.189 and the melting point analyzed by DSC was 325.9° C.

Preparation 2 (Preparation of Aqueous Dispersion of TFE-HFP-VdF Copolymer)

A 3-L-capacity SUS-made polymerization vessel with a stirrer was charged with a solution obtained by dissolving $F(CF_2)_5COONH_4$ and $CH_2=CFCF_2OCF(CF_3)CF_2OCF(CF_3)COONH_4$ in pure water to concentrations of 3300 ppm and 200 ppm, respectively, and was then hermetically sealed. The atmosphere in the vessel was evacuated and replaced with nitrogen, and the vessel was then evacuated. Further, ethane as a chain transfer agent in an amount equivalent to 400 cc was charged using a syringe under vacuum. Thereafter, while the mixture was stirred at 70° C. and 450 rpm, a gaseous monomer mixture of VdF/TFE/HFP at a compositional ratio of 50/38/12 mol % was charged into the vessel until the pressure reached 0.39 MPaG. Next, a solution of APS (137.2 mg) in water (10 g) was injected under pressure into the vessel with nitrogen, and thereby reaction was started. In order to prevent the solution from remaining in the reaction pipe, water (10 g) was again injected under pressure into the pipe with nitrogen.

A monomer mixture of VdF/TFE/HFP with a compositional ratio of 60/38/2 mol % was additionally put so as to keep the pressure in the vessel. When the amount of the additional monomer reached 346 g, the stirring rate was reduced to low, the gas inside the vessel was blown, and thereby the reaction was finished. The inside of the vessel was cooled down, and an aqueous dispersion of a VdF/TFE/HFP copolymer (hereinafter, referred to as THV) particles (1708 g) was collected in a container. The solids concentration of the aqueous dispersion by a dry weight method was 20.4% by mass. The copolymer composition by NMR analysis was VdF/TFE/HFP=59.0/38.9/2.1 (mol %), and the melting point by DSC analysis was 145.9° C.

Preparation 3 (Preparation of PTFE/THV Organosol)

The aqueous dispersion of PTFE particles (40.0 g) obtained in Preparation 1, the aqueous dispersion of THV particles (41.0 g) obtained in Preparation 2, and hexane (16 g) were put into a 200-mL beaker, and were stirred using a mechanical stirrer. Acetone (90 g) was added under stirring, and then the mixture was stirred for four minutes. After the stirring, the generated coagulum and supernatant liquid mainly containing water were filtered to be separated out. The remaining water-containing coagulum was mixed with dimethylacetamide (DMAC) (about 190 g), and the mixture was stirred for 30 minutes. The resulting mixture was put into a 500-ml recovery flask, and then the water was removed with an evaporator. Thereby, 158 g of an organosol containing PTFE particles uniformly dispersed in DMAC was obtained. The solids concentration in the organosol was 12.0% by mass, and the water concentration measured by the Karl Fischer method was not higher than 100 ppm. The mass ratio of PTFE/THV measured by solid-state NMR was 61/39. Further, this organosol was left to stand and visually observed, and neither separated layers nor particles were observed even after 10 days or longer.

Example 1

Production of Electrode

Active carbon particles (100 parts by weight) (YP50F, KURARAY CHEMICAL CO., LTD.), acetylene black (3 parts by weight) (DENKA BLACK FX-35, DENKI KAGAKU KOGYO KABUSHIKI KAISHA) as a conductive additive, Ketjenblack (12 parts by weight) (CARBON ECP600JD, Ketchen black international Inc.), a PVdF binder (7 parts by weight) (KF-7200, KUREHA CORP.), and the organosol (dispersing solution of PTFE and THV) obtained in Preparation 3 (solids content equivalent to 3 parts by weight) were mixed to prepare a slurry for an electrode.

An etched aluminum (20CB, JAPAN CAPACITOR INDUSTRIAL CO., LTD., thickness: about 20 μm) was prepared as a current collector. Both surfaces of this current collector were coated with a conductive coating (Varniphite T602, Nippon Graphite Industries, ltd.) using a coating device, and thereby conductive layers (thickness: 7±1 μm) were formed.

Then, the slurry for an electrode prepared above was coated on the conductive layers formed on the both surfaces of the current collector to form active carbon layers (electrode layers, density: 0.47 to 0.48 g/cm$^3$, positive electrode thickness: 100 μm, negative electrode thickness: 80 μm) on the both surfaces, and thereby an electrode was produced.

Hereinafter, the current collector, the conductive layers, and the active carbon layers are collectively referred to as an electrode.

Preparation of Electrolyte Solution—1

Acetonitrile was blended with molecular sieve for dehydration thereof, thereby preparing a solvent for an electrolyte solution. To the solvent for an electrolyte solution was added tetraethylammonium tetrafluoroborate (TEABF$_4$) to a concentration of 1.0 mol/l, and the substance was uniformly dissolved therein.

(Production of Electric Double Layer Capacitor)

The electrode was cut into a predetermined size (20×72 mm). The electrode-leading lead was weld-bonded to the aluminum face of the current collector and the workpiece was stored in a laminate container (product number: D-EL40H, manufacturer: Dai Nippon Printing Co., Ltd.). The separator prepared by cutting TF45-30 (NIPPON KODOSHI CORPORATION) into a predetermined size (30×82 mm) was inserted therebetween and an electrolyte solution was injected into the container so that the workpiece was impregnated with the solution in the dry chamber. Then, the container was sealed, and thereby a laminated cell electric double layer capacitor was produced.

(Evaluation on Characteristics of Electric Double Layer Capacitor)

The obtained electric double layer capacitor was measured for its resistance increase rate (rate of increase in internal resistance) and capacity retention factor (capacitance retention) by the following methods, and evaluated. Table 1 shows the results.

(Measurement of Resistance Increase Rate (Rate of Increase in Internal Resistance) and Capacity Retention Factor (Capacitance Retention))

The electric double layer capacitor was put into a constant-temperature container at 60° C., and then a voltage (2.7 V) was applied thereto for 250 hours to measure the internal resistance and capacitance. The measurement timings were initial (0 hours) and 250 hours. The rate of increase in internal resistance and capacity retention factor were calculated by the following formulas based on the obtained measurement values.

Rate of increase in internal resistance=(Internal resistance after 250 hours)/(Internal resistance before evaluation (initial internal resistance))

Capacity retention factor=(Capacitance after 250 hours)/(Capacitance before evaluation (initial capacitance))

The evaluation was made based on the following criteria: the capacitor having a resistance increase rate of at most 1.2 times and a capacity retention factor of at least 0.93 times was rated Good; and the capacitor having a resistance increase rate of more than 1.2 times or a capacity retention factor of less than 0.93 times was rated Poor.

TABLE 1

|  | Oxazole (ppm) | Ammonia (ppm) | Triethylamine (ppm) | Moisture (ppm) | Potassium (ppm) | Resistance increase rate | Capacity retention | Evaluation |
|---|---|---|---|---|---|---|---|---|
| Example 1 | 1 | 1 | less than 10 | 6 | less than 1 | 1.1 | 0.96 | Good |

Example 2

Preparation of Electrolyte Solution—2

Sulfolane and acetonitrile were mixed at a volume ratio of 10/90 to give a mixed liquid. The resulting mixed liquid was blended with molecular sieve for dehydration thereof to prepare a solvent for an electrolyte solution. To this solvent for an electrolyte solution was added tetraethyl ammonium tetrafluoroborate (TEABF$_4$) so as to a concentration of 1.0 mol/l, and the substance was uniformly dissolved therein.

(Production and Evaluation of Electrical Double Layer Capacitor)

An electrical double layer capacitor was produced in the same manner as in Example 1 using the obtained electrolyte solution. The resulting electrical double layer capacitor was measured in the same manner as in Example 1, except that the voltage applied was set to 3.0 V, for the resistance increase rate (internal resistance increase rate) and the capacity retention factor (capacitance retention), and evaluated. Table 2 shows the results.

Examples 3 to 6 and Comparative Examples 1 to 10

Preparation of electrolyte solutions, production of electrical double layer capacitors, and evaluation of the properties were performed in the same manner as in Example 2, except that the amounts of impurities were changed as shown in Table 2. Table 2 shows the results.

TABLE 2

|  | Oxazole (ppm) | Ammonia (ppm) | Triethylamine | Moisture (ppm) | Porassium (ppm) | Resistance increase rate | Capacity retention | Evaluation |
|---|---|---|---|---|---|---|---|---|
| Example 2 | 1 | 1 | less than 10 | 6 | less than 1 | 1.1 | 0.96 | Good |
| Example 3 | 30 | 1 | less than 10 | 6 | less than 1 | 1.1 | 0.94 | Good |
| Comparative Example 1 | 50 | 1 | less than 10 | 6 | less than 1 | 1.3 | 0.92 | Poor |
| Comparative Example 2 | 100 | 1 | less than 10 | 6 | less than 1 | 1.5 | 0.91 | Poor |
| Example 4 | 1 | 20 | less than 10 | 6 | less than 1 | 1.1 | 0.94 | Good |
| Comparative Example 3 | 1 | 50 | less than 10 | 6 | less than 1 | 1.4 | 0.92 | Poor |

TABLE 2-continued

|  | Oxazole (ppm) | Ammonia (ppm) | Triethylamine | Moisture (ppm) | Porassium (ppm) | Resistance increase rate | Capacity retention | Evaluation |
|---|---|---|---|---|---|---|---|---|
| Comparative Example 4 | 1 | 100 | less than 10 | 6 | less than 1 | 1.6 | 0.91 | Poor |
| Example 5 | 1 | 1 | 30 | 6 | less than 1 | 1.1 | 0.95 | Good |
| Comparative Example 5 | 1 | 1 | 50 | 6 | less than 1 | 1.5 | 0.91 | Poor |
| Comparative Example 6 | 1 | 1 | 100 | 6 | less than 1 | 2.5 | 0.87 | Poor |
| Example 6 | 1 | 1 | less than 10 | 20 | less than 1 | 1.1 | 0.95 | Good |
| Comparative Example 7 | 1 | 1 | less than 10 | 50 | less than 1 | 1.7 | 0.91 | Poor |
| Comparative Example 8 | 1 | 1 | less than 10 | 100 | less than 1 | 2.8 | 0.86 | Poor |
| Comparative Example 9 | 1 | 1 | less than 10 | 6 | 10 | 1.9 | 0,91 | Poor |
| Comparative Example 10 | 1 | 1 | less than 10 | 6 | 20 | 2.1 | 0.91 | Poor |

Example 7

Preparation of Electrolyte Solution—3

Sulfolane, acetonitrile, and $HCF_2CF_2CH_2OCF_2CF_2H$ were mixed at a volume ratio of 5/92.5/2.5 to give a mixed liquid. The mixed liquid was blended with molecular sieve for dehydration thereof, thereby preparing a solvent for an electrolyte solution. To this solvent for an electrolyte solution was added tetraethylammonium tetrafluoroborate (TEABF$_4$) so as to a concentration of 1.0 mol/l, and the substance was uniformly dissolved therein.

(Production and Evaluation of Properties of Electrical Double Layer Capacitor)

An electrical double layer capacitor was produced in the same manner as in Example 1 using the obtained electrolyte solution. The resulting electrical double layer capacitor was measured in the same manner as in Example 2 for the resistance increase rate (internal resistance increase rate) and the capacity retention factor (capacitance retention), and evaluated. Table 3 shows the results.

Examples 8 to 11 and Comparative Examples 11 to 20

Preparation of electrolyte solutions, production of electrical double layer capacitors, and evaluation of the performance were performed in the same manner as in Example 7, except that the amounts of impurities were changed as shown in Table 3. Table 3 shows the results.

TABLE 3

|  | Oxazole (ppm) | Ammonia (ppm) | Triethylamine (ppm) | Moisture (ppm) | Potassium (ppm) | Resistance increase rate | Capacity retention | Evaluation |
|---|---|---|---|---|---|---|---|---|
| Example 7 | 1 | 1 | less than 10 | 6 | less than 1 | 1.1 | 0.95 | Good |
| Example 8 | 30 | 1 | less than 10 | 6 | less than 1 | 1.2 | 0.93 | Good |
| Comparative Example 11 | 50 | 1 | less than 10 | 6 | less than 1 | 1.4 | 0.92 | Poor |
| Comparative Example 12 | 100 | 1 | less than 10 | 6 | less than 1 | 1.6 | 0.89 | Poor |
| Example 9 | 1 | 20 | less than 10 | 6 | less than 1 | 1.1 | 0.93 | Good |
| Comparative Example 13 | 1 | 50 | less than 10 | 6 | less than 1 | 1.5 | 0.91 | Poor |
| Comparative Example 14 | 1 | 100 | less than 10 | 6 | less than 1 | 1.7 | 0.90 | Poor |
| Example 10 | 1 | 1 | 30 | 6 | less than 1 | 1.2 | 0.94 | Good |
| Comparative Example 15 | 1 | 1 | 50 | 6 | less than 1 | 1.6 | 0.90 | Poor |
| Comparative Example 16 | 1 | 1 | 100 | 6 | less than 1 | 2.7 | 0.86 | Poor |
| Example 11 | 1 | 1 | less than 10 | 20 | less than 1 | 1.1 | 0.94 | Good |
| Comparative Example 17 | 1 | 1 | less than 10 | 50 | less than 1 | 1.8 | 0.90 | Poor |
| Comparative Example 18 | 1 | 1 | less than 10 | 100 | less than 1 | 2.9 | 0.85 | Poor |
| Comparative Example 19 | 1 | 1 | less than 10 | 6 | 10 | 2.0 | 0.90 | Poor |
| Comparative Example 20 | 1 | 1 | less than 10 | 6 | 20 | 2.3 | 0.90 | Poor |

Example 12

Preparation of Electrolyte Solution—4

Sulfolane, acetonitrile, and $HCF_2CF_2CH_2OCF_2CF_2H$ were mixed at a volume ratio of 5/92.5/2.5 to give a mixed liquid. The mixed liquid was blended with molecular sieve for dehydration thereof, thereby preparing a solvent for an electrolyte solution. To this solvent for an electrolyte solution was added triethyl methylammonium tetrafluoroborate (TEMABF$_4$) so as to a concentration of 1.0 mol/l, and the substance was uniformly dissolved therein.

(Production and Evaluation of Properties of Electrical Double Layer Capacitor)

An electrical double layer capacitor was produced in the same manner as in Example 1 using the obtained electrolyte solution. The resulting electrical double layer capacitor was measured in the same manner as in Example 2 for the resistance increase rate (internal resistance increase rate) and the capacity retention factor (capacitance retention), and evaluated. Table 4 shows the results.

Examples 13 to 16 and Comparative Examples 21 to 30

Preparation of electrolyte solutions, production of electrical double layer capacitors, and evaluation of properties of the performance were carried out in the same manner as in Example 12, except that the amounts of impurities were changed as shown in Table 4. Table 4 shows the results.

TABLE 4

|  | Oxazole (ppm) | Ammonia (ppm) | Triethylamine (ppm) | Moisture (ppm) | Potassium (ppm) | Resistance increase rate | Capacity retention | Evaluation |
|---|---|---|---|---|---|---|---|---|
| Example 12 | 1 | 1 | less than 10 | 6 | less than 1 | 1.0 | 0.96 | Good |
| Example 13 | 30 | 1 | less than 10 | 6 | less than 1 | 1.0 | 0.94 | Good |
| Comparative Example 21 | 50 | 1 | less than 10 | 6 | less than 1 | 1.4 | 0.91 | Poor |
| Comparative Example 22 | 100 | 1 | less than 10 | 6 | less than 1 | 1.5 | 0.90 | Poor |
| Example 14 | 1 | 20 | less than 10 | 6 | less than 1 | 1.1 | 0.94 | Good |
| Comparative Example 23 | 1 | 50 | less than 10 | 6 | less than 1 | 1.4 | 0.91 | Poor |
| Comparative Example 24 | 1 | 100 | less than 10 | 6 | less than 1 | 1.7 | 0.91 | Poor |
| Example 15 | 1 | 1 | 30 | 6 | less than 1 | 1.1 | 0.95 | Good |
| Comparative Example 25 | 1 | 1 | 50 | 6 | less than 1 | 1.5 | 0.91 | Poor |
| Comparative Example 26 | 1 | 1 | 100 | 6 | less than 1 | 2.5 | 0.87 | Poor |
| Example 16 | 1 | 1 | less than 10 | 20 | less than 1 | 1.0 | 0.95 | Good |
| Comparative Example 27 | 1 | 1 | less than 10 | 50 | less than 1 | 1.8 | 0.90 | Poor |
| Comparative Example 28 | 1 | 1 | less than 10 | 100 | less than 1 | 2.8 | 0.85 | Poor |
| Comparative Example 29 | 1 | 1 | less than 10 | 6 | 10 | 1.9 | 0.89 | Poor |
| Comparative Example 30 | 1 | 1 | less than 10 | 6 | 20 | 2.1 | 0.88 | Poor |

Example 17

Preparation of Electrolyte Solution—5

Acetonitrile was blended with molecular sieve for dehydration thereof, thereby preparing a solvent for an electrolyte solution. To the solvent for an electrolyte solution was added Spiro bipyridinium tetrafluoroborate (SBPBF$_4$) to a concentration of 1.5 mol/l, and the substance was uniformly dissolved therein.

(Production and Evaluation of Properties of Electrical Double Layer Capacitor)

An electrical double layer capacitor was produced in the same manner as in Example 1 using the obtained electrolyte solution. The resulting electrical double layer capacitor was measured in the same manner as in Example 2 for the resistance increase rate (internal resistance increase rate) and the capacity retention factor (capacitance retention), and evaluated. Table 5 shows the results.

Examples 18 to 21 and Comparative Examples 31 to 40

Preparation of electrolyte solutions, production of electrical double layer capacitors, and evaluation of the properties were carried out in the same manner as in Example 17, except that the amounts of impurities were changed as shown in Table 5. Table 5 shows the results.

TABLE 5

| | Oxazole (ppm) | Ammonia (ppm) | Triethylamine (ppm) | Moisture (ppm) | Potassium (ppm) | Resistance increase rate | Capacity retention | Evaluation |
|---|---|---|---|---|---|---|---|---|
| Example 17 | 1 | 1 | less than 10 | 6 | less than 1 | 1.2 | 0.94 | Good |
| Example 18 | 30 | 1 | less than 10 | 6 | less than 1 | 1.2 | 0.93 | Good |
| Comparative Example 31 | 50 | 1 | less than 10 | 6 | less than 1 | 1.4 | 0.91 | Poor |
| Comparative Example 32 | 100 | 1 | less than 10 | 6 | less than 1 | 1.7 | 0.87 | Poor |
| Example 19 | 1 | 20 | less than 10 | 6 | less than 1 | 1.2 | 0.93 | Good |
| Comparative Example 33 | 1 | 50 | less than 10 | 6 | less than 1 | 1.6 | 0.90 | Poor |
| Comparative Example 34 | 1 | 100 | less than 10 | 6 | less than 1 | 1.9 | 0.89 | Poor |
| Example 20 | 1 | 1 | 30 | 6 | less than 1 | 1.2 | 0.94 | Good |
| Comparative Example 35 | 1 | 1 | 50 | 6 | less than 1 | 1.7 | 0.89 | Poor |
| Comparative Example 36 | 1 | 1 | 100 | 6 | less than 1 | 2.8 | 0.85 | Poor |
| Example 21 | 1 | 1 | less than 10 | 20 | less than 1 | 1.2 | 0.94 | Good |
| Comparative Example 37 | 1 | 1 | less than 10 | 50 | less than 1 | 1.8 | 0.89 | Poor |
| Comparative Example 38 | 1 | 1 | less than 10 | 100 | less than 1 | 2.9 | 0.86 | Poor |
| Comparative Example 39 | 1 | 1 | less than 10 | 6 | 10 | 2.0 | 0.90 | Poor |
| Comparative Example 40 | 1 | 1 | less than 10 | 6 | 20 | 2.3 | 0.90 | Poor |

Example 22

Preparation of Electrolyte Solution—6

3-Methyl sulfolane, acetonitrile, and $HCF_2CF_2CH_2OCF_2CF_2H$ were mixed at a volume ratio of 5/92.5/2.5 to give a mixed liquid. The mixed liquid was blended with molecular sieve for dehydration thereof, thereby preparing a solvent for an electrolyte solution. To the solvent for an electrolyte solution was added Spiro bipyridinium tetrafluoroborate ($SBPBF_4$) to a concentration of 1.0 mol/l, and the substance was uniformly dissolved therein.

(Production and Evaluation of Properties of Electrical Double Layer Capacitor)

An electrical double layer capacitor was produced in the same manner as in Example 1 using the obtained electrolyte solution. The resulting electrical double layer capacitor was measured in the same manner as in Example 2 for the resistance increase rate (internal resistance increase rate) and the capacity retention factor (capacitance retention), and evaluated. Table 6 shows the results.

Examples 23 to 26 and Comparative Examples 41 to 50

Preparation of electrolyte solutions, production of electrical double layer capacitors, and evaluation of the performance were carried out in the same manner as in Example 22, except that the amounts of impurities were changed as shown in Table 6. Table 6 shows the results.

TABLE 6

| | Oxazole (ppm) | Ammonia (ppm) | Triethylamine (ppm) | Moisture (ppm) | Potassium (ppm) | Resistance increase rate | Capacity retention | Evaluation |
|---|---|---|---|---|---|---|---|---|
| Example 22 | 1 | 1 | less than 10 | 6 | less than 1 | 1.2 | 0.93 | Good |
| Example 23 | 30 | 1 | less than 10 | 6 | less than 1 | 1.2 | 0.93 | Good |
| Comparative Example 41 | 50 | 1 | less than 10 | 6 | less than 1 | 1.5 | 0.90 | Poor |
| Comparative Example 42 | 100 | 1 | less than 10 | 6 | less than 1 | 1.8 | 0.85 | Poor |
| Example 24 | 1 | 20 | less than 10 | 6 | less than 1 | 1.2 | 0.93 | Good |
| Comparative Example 43 | 1 | 50 | less than 10 | 6 | less than 1 | 1.7 | 0.89 | Poor |
| Comparative Example 44 | 1 | 100 | less than 10 | 6 | less than 1 | 1.9 | 0.88 | Poor |
| Example 25 | 1 | 1 | 30 | 6 | less than 1 | 1.2 | 0.93 | Good |
| Comparative Example 45 | 1 | 1 | 50 | 6 | less than 1 | 1.7 | 0.88 | Poor |
| Comparative Example 46 | 1 | 1 | 100 | 6 | less than 1 | 2.8 | 0.84 | Poor |
| Example 26 | 1 | 1 | less than 10 | 20 | less than 1 | 1.2 | 0.93 | Good |
| Comparative Example 47 | 1 | 1 | less than 10 | 50 | less than 1 | 1.8 | 0.88 | Poor |
| Comparative Example 48 | 1 | 1 | less than 10 | 100 | less than 1 | 2.9 | 0.87 | Poor |

TABLE 6-continued

| | Oxazole (ppm) | Ammonia (ppm) | Triethylamine (ppm) | Moisture (ppm) | Potassium (ppm) | Resistance increase rate | Capacity retention | Evaluation |
|---|---|---|---|---|---|---|---|---|
| Comparative Example 49 | 1 | 1 | less than 10 | 6 | 10 | 2.1 | 0.88 | Poor |
| Comparative Example 50 | 1 | 1 | less than 10 | 6 | 20 | 2.3 | 0.87 | Poor |

Example 27

Preparation of Electrolyte Solution—7

Sulfolane, acetonitrile, and $HCF_2CF_2CH_2OCF_2CFHCF_3$ were mixed at a volume ratio of 5/92.5/2.5 to give a mixed liquid. The mixed liquid was blended with molecular sieve for dehydration thereof, thereby preparing a solvent for an electrolyte solution. To the solvent for an electrolyte solution was added spiro bipyridinium tetrafluoroborate ($SBPBF_4$) to a concentration of 1.0 mol/l, and the substance was uniformly dissolved therein.

(Production and Evaluation of Properties of Electrical Double Layer Capacitor)

An electrical double layer capacitor was produced in the same manner as in Example 1 using the obtained electrolyte solution. The resulting electrical double layer capacitor was measured in the same manner as in Example 2 for the resistance increase rate (internal resistance increase rate) and the capacity retention factor (capacitance retention), and evaluated. Table 7 shows the results.

Examples 28 to 31 and Comparative Examples 51 to 60

Preparation of electrolyte solutions, production of electrical double layer capacitors, and evaluation of the performance were carried out in the same manner as in Example 27, except that the amounts of impurities were changed as shown in Table 7. Table 7 shows the results.

Example 32

Preparation of Electrolyte Solution—8

Sulfolane, acetonitrile, and $HCF_2CF_2CH_2OCF_2CF_2H$ were mixed at a volume ratio of 5/92.5/2.5 to give a mixed liquid. The mixed liquid was blended with molecular sieve for dehydration thereof, thereby preparing a solvent for an electrolyte solution. To the solvent for an electrolyte solution was added Spiro bipyridinium tetrafluoroborate ($SBPBF_4$) to a concentration of 0.5 mol/l, and the substance was uniformly dissolved therein.

(Production and Evaluation of Properties of Electrical Double Layer Capacitor)

An electrical double layer capacitor was produced in the same manner as in Example 1 using the obtained electrolyte solution. The resulting electrical double layer capacitor was measured in the same manner as in Example 2 for the resistance increase rate (internal resistance increase rate) and the capacity retention factor (capacitance retention), and evaluated. Table 8 shows the results.

Examples 33 to 36 and Comparative Examples 61 to 70

Preparation of electrolyte solutions, production of electrical double layer capacitors, and evaluation of the properties were carried out in the same manner as in Example 32, except that the amounts of impurities were changed as shown in Table 8. Table 8 shows the results.

TABLE 7

| | Oxazole (ppm) | Ammonia (ppm) | Triethylamine (ppm) | Moisture (ppm) | Potassium (ppm) | Resistance increase rate | Capacity retention | Evaluation |
|---|---|---|---|---|---|---|---|---|
| Example 27 | 1 | 1 | less than 10 | 6 | less than 1 | 1.1 | 0.95 | Good |
| Example 28 | 30 | 1 | less than 10 | 6 | less than 1 | 1.1 | 0.94 | Good |
| Comparative Example 51 | 50 | 1 | less than 10 | 6 | less than 1 | 1.5 | 0.89 | Poor |
| Comparative Example 52 | 100 | 1 | less than 10 | 6 | less than 1 | 1.8 | 0.86 | Poor |
| Example 29 | 1 | 20 | less than 10 | 6 | less than 1 | 1.2 | 0.94 | Good |
| Comparative Example 53 | 1 | 50 | less than 10 | 6 | less than 1 | 1.7 | 0.89 | Poor |
| Comparative Example 54 | 1 | 100 | less than 10 | 6 | less than 1 | 1.9 | 0.88 | Poor |
| Example 30 | 1 | 1 | 30 | 6 | less than 1 | 1.1 | 0.94 | Good |
| Comparative Example 55 | 1 | 1 | 50 | 6 | less than 1 | 1.7 | 0.88 | Poor |
| Comparative Example 56 | 1 | 1 | 100 | 6 | less than 1 | 2.8 | 0.84 | Poor |
| Example 31 | 1 | 1 | less than 10 | 20 | less than 1 | 1.2 | 0.94 | Good |
| Comparative Example 57 | 1 | 1 | less than 10 | 50 | less than 1 | 1.8 | 0.88 | Poor |
| Comparative Example 58 | 1 | 1 | less than 10 | 100 | less than 1 | 2.9 | 0.87 | Poor |
| Comparative Example 59 | 1 | 1 | less than 10 | 6 | 10 | 2.1 | 0.88 | Poor |
| Comparative Example 60 | 1 | 1 | less than 10 | 6 | 20 | 2.3 | 0.87 | Poor |

TABLE 8

| | Oxazole (ppm) | Ammonia (ppm) | Triethylamine (ppm) | Moisture (ppm) | Potassium (ppm) | Resistance increase rate | Capacity retention | Evaluation |
|---|---|---|---|---|---|---|---|---|
| Example 32 | 1 | 1 | less than 10 | 6 | less than 1 | 1.0 | 0.95 | Good |
| Example 33 | 30 | 1 | less than 10 | 6 | less than 1 | 1.0 | 0.94 | Good |
| Comparative Example 61 | 50 | 1 | less than 10 | 6 | less than 1 | 1.5 | 0.91 | Poor |
| Comparative Example 62 | 100 | 1 | less than 10 | 6 | less than 1 | 1.8 | 0.90 | Poor |
| Example 34 | 1 | 20 | less than 10 | 6 | less than 1 | 1.1 | 0.95 | Good |
| Comparative Example 63 | 1 | 50 | less than 10 | 6 | less than 1 | 1.7 | 0.89 | Poor |
| Comparative Example 64 | 1 | 100 | less than 10 | 6 | less than 1 | 1.9 | 0.88 | Poor |
| Example 35 | 1 | 1 | 30 | 6 | less than 1 | 1.1 | 0.95 | Good |
| Comparative Example 65 | 1 | 1 | 50 | 6 | less than 1 | 1.7 | 0.88 | Poor |
| Comparative Example 66 | 1 | 1 | 100 | 6 | less than 1 | 2.8 | 0.85 | Poor |
| Example 36 | 1 | 1 | less than 10 | 20 | less than 1 | 1.1 | 0.94 | Good |
| Comparative Example 67 | 1 | 1 | less than 10 | 50 | less than 1 | 1.8 | 0.88 | Poor |
| Comparative Example 68 | 1 | 1 | less than 10 | 100 | less than 1 | 2.9 | 0.87 | Poor |
| Comparative Example 69 | 1 | 1 | less than 10 | 6 | 10 | 2.1 | 0.90 | Poor |
| Comparative Example 70 | 1 | 1 | less than 10 | 6 | 20 | 2.3 | 0.91 | Poor |

The invention claimed is:

1. An electrolyte solution comprising:
   a nitrile compound; and
   a quaternary ammonium salt,
   the electrolyte solution having a potassium ion content of less than 10 ppm,
   a moisture content of 20 ppm or less,
   a tertiary amine content of 30 ppm or less,
   a heterocyclic compound content of 30 ppm or less, and
   an ammonia content of 20 ppm or less.

2. The electrolyte solution according to claim 1, wherein the quaternary ammonium salt is triethylmethylammonium tetrafluoroborate, or tetraethylammonium tetrafluoroborate.

3. The electrolyte solution according to claim 1, wherein the nitrile compound is acetonitrile.

4. The electrolyte solution according to claim 1, further comprising a sulfolane compound.

5. The electrolyte solution according to claim 1, further comprising a fluorine-containing ether.

6. The electrolyte solution according to claim 1, wherein the quaternary ammonium salt has a concentration of 0.1 to 2.5 mol/l.

7. The electrolyte solution according to claim 1 for an electrochemical device.

8. The electrolyte solution according to claim 1 for an electrical double layer capacitor.

9. An electrochemical device comprising:
   the electrolyte solution according to claim 1;
   a positive electrode; and
   an negative electrode.

10. The electrochemical device according to claim 9, which is an electrical double layer capacitor.

11. The electrolyte solution according to claim 1, wherein the quaternary ammonium salt is at least one of the group consisting of a tetraalkyl quaternary ammonium salt represented by the formula (IIA):

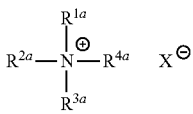

wherein $R^{1a}$, $R^{2a}$, $R^{3a}$, and $R^{4a}$ may be the same as or different from one another, and each are a C1-C6 alkyl group that may have an ether bond; and $X^-$ is $BF_4^-$, $PF_6^-$, $AsF_6^-$ or $SbF_6^-$, a spirobipyridinium salt represented by the formula (IIB):

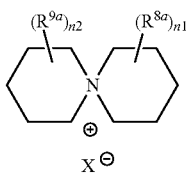

wherein $R^{8a}$ and $R^{9a}$ may be the same as or different from each other, and each are a C1-C4 alkyl group; $X^-$ is $BF_4^-$, $PF_6^-$, $AsF_6^-$ or $SbF_6^-$; n1 is an integer of 0 to 5; and n2 is an integer of 0 to 5, an imidazolium salt represented by the formula (IIC):

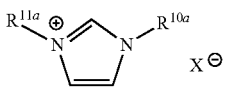

wherein $R^{10a}$ and $R^{11a}$ may be the same as or different from each other, and each are a C1-C6 alkyl group; and $X^-$ is $BF_4^-$, $PF_6^-$, $AsF_6^-$ or $SbF_6^-$, or an N-alkylpyridinium salt represented by the formula (IID):

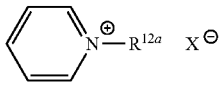

wherein $R^{12a}$ is a C1-C6 alkyl group; and $X^-$ is $BF_4^-$, $PF_6^-$, $AsF_6^-$ or $SbF_6^-$.

12. The electrolyte solution according to claim 1, wherein the quaternary ammonium salt is at least one of the group consisting of compounds represented by the following formulas:

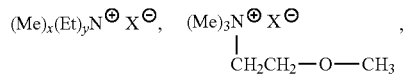

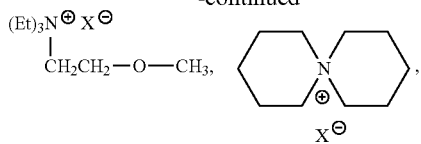

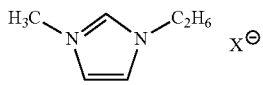

wherein Me represents a methyl group; Et represents an ethyl group; and $X^-$ is $BF_4^-$, $PF_6^-$, $AsF_6^-$ or $SbF_6^-$; and x and y may be the same as or different from each other and each are an integer of 0 to 4, provided that x+y=4.

* * * * *